July 30, 1929.　　　　L. VETTER　　　　1,722,403
LIQUID SPRAYER
Filed July 23, 1927
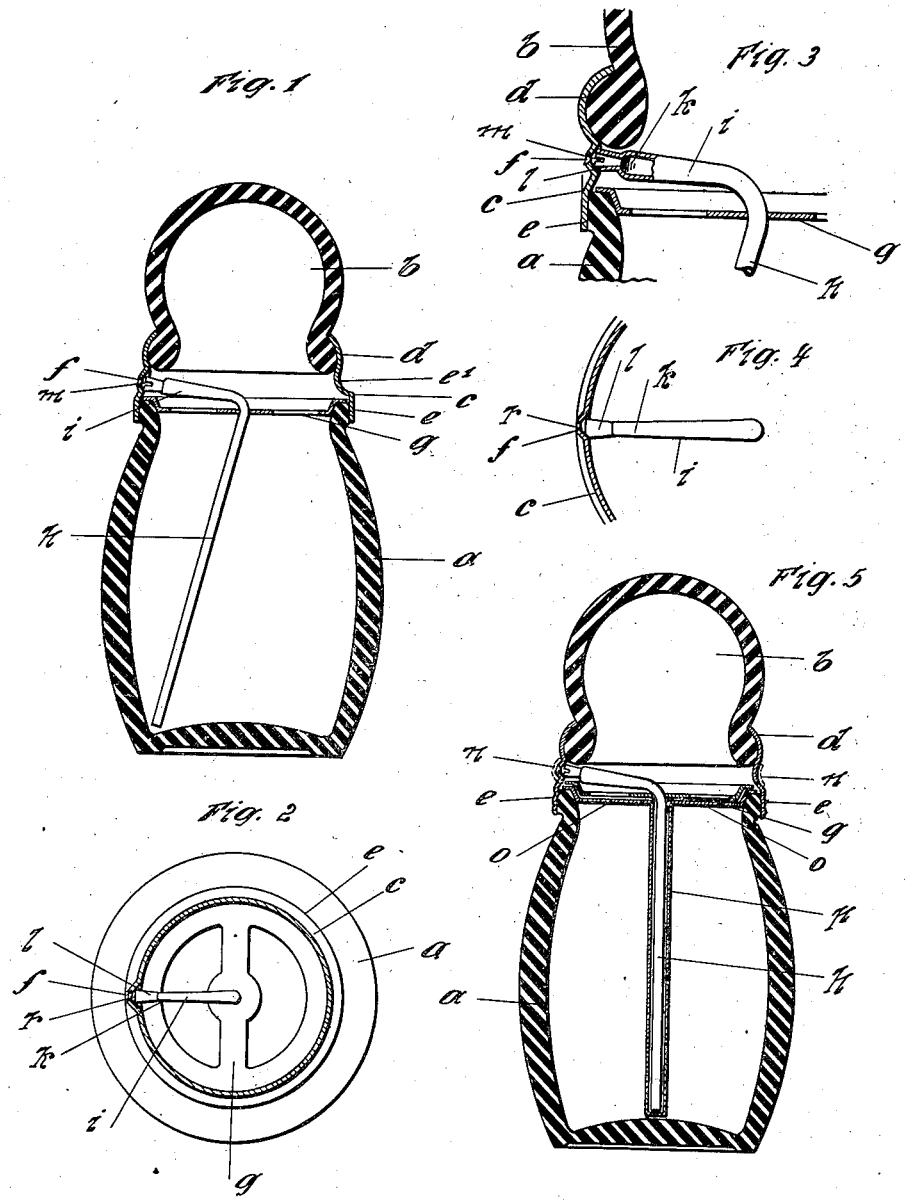

Patented July 30, 1929.

1,722,403

UNITED STATES PATENT OFFICE.

LUDWIG VETTER, OF NUREMBERG, GERMANY.

LIQUID SPRAYER.

Application filed July 23, 1927, Serial No. 207,998, and in Germany November 13, 1926.

My present invention has for its object a liquid sprayer, which is arranged in such a manner that the air pressure means is connected with the container by means of a ferrule member. The upper end of the latter has the shape of a projecting collar on which the exchangeable air pressure means is mounted, whilst the lower end is united with the container in the usual manner. In the middle of the ferrule member a groove is provided, which carries the outlet passage for the liquid. The ferrule supports within the container a bridge member, on which the spraying tube extending downwardly into the interior of the container is supported so as to plunge into the contents of the container. The mouth of the spraying tube is shaped as a nozzle, so that a thorough spraying of the liquid is obtained. For this purpose the spraying tube is provided near its mouth with a contraction, which is continued as a diverging member having lateral passages to allow the entrance of fresh air. Between the mouth of the spraying tube and the wall of the container a small split is provided in order to ensure a thorough spraying of the liquid.

The described liquid sprayer shall also be used as bottle and therefore it is necessary to provide a closure to prevent the contents from flowing out. This is obtained by the arrangement of an elastic band lying within the groove of the ferrule member and surrounding the periphery of same.

A further closure for the container consists in arranging beneath the bridge member supporting the spraying tube a carrier, which supports a shell closed on its lower end and adapted to receive concentrically the spraying tube. This allows of using the liquid sprayer as a bottle so that an outflow of the contents is avoided.

The accompanying drawings show the present invention by way of example, in which Fig. 1 is a longitudinal section and Fig. 2 is a cross section of the liquid sprayer, Figs. 3 and 4 are sectional views of the nozzle on an enlarged scale and Fig. 5 illustrates in a longitudinal section the closure of a liquid sprayer used as a bottle.

The liquid sprayer consists of the container $a$ made of any suitable material receiving the liquid and the rubber like air pressure means $b$, which shows in a well known manner the shape of a pear. The container $a$ and the air pressure means $b$ are connected with each other by means of a ferrule member $c$ shaped at its upper end as a projecting collar $d$ receiving the air pressure means, whilst the lower end $e$ is united in any suitable known manner with the container. In the middle of the ferrule member there is provided a groove $e'$, in which the outlet passage $f$ is arranged. The ferrule member $c$ supports within the container a bridge member $g$ consisting of a disk, by means of which the spraying tube $h$ is held in position whereby the mouth of the latter registers with the outlet passage $f$ provided in the ferrule member $c$, whilst the other end of the spraying tube projects vertically into the inner of the container $a$. The mouth of the spraying tube $h$ is nozzle-shaped and—in order to ensure a thorough spraying—contracted at $i$, so that a contraction $k$ is formed in continuation of which a diverging member $l$ having lateral passages $m$ is attached, whereby the latter are adapted to allow the entrance of fresh air. For obtaining a thorough spraying of the liquid a small split $r$ is provided between the mouth of the spraying tube and the wall of the container, so that a thorough spraying of the liquid by the splash upon the rim is secured.

The liquid sprayer can also be used as a bottle, for which purpose the container is fitted with a closure to prevent the contents from flowing out. For this reason an elastic band $n$ is arranged within the groove this band lying over the outlet passage, so that the latter is covered. A further closure for the bottle to avoid the outflow of the contents is shown in Fig. 5. According to this illustration a carrier $o$ is arranged below the bridge member, which is provided with a shell $p$ extending downwardly. This shell is closed at its lower end and receives the spraying tube $h$, so that same lies concentrically within the shell $p$.

If it is intended to use the bottle as a sprayer, it is necessary to take off the elastic band $n$ lying within the groove of the ferrule member, or for the further closing according to Fig. 5 the carrier supporting the shell is taken off, so that the spraying tube can plunge into the liquid of the container.

The operation of the liquid sprayer is of such a kind, that the spraying tube plunges into the liquid. By pressure exerted upon the elastic means the air contained above the liquid level will be compressed and consequently the liquid is forced out through the spraying tube and the nozzle, the special construction of which ensures that the liquid is thoroughly sprayed about or atomized.

What I claim is:

In a spraying device having a container and air pressure means, a ferrule member having on its upper and lower ends projecting collars respectively engaging said air pressure means and said container, said ferrule having between said collars a grooved portion, said grooved portion having a spray orifice therethrough, a spraying tube extending downwardly within the container to a point adjacent the bottom thereof, a bridge member carrying the spraying tube and so held between said ferrule member and said container that the upper end of the spraying tube registers with the said spray orifice.

In testimony whereof I affix my signature.

LUDWIG VETTER.